(12) United States Patent
Yokote et al.

(10) Patent No.: US 8,366,151 B2
(45) Date of Patent: Feb. 5, 2013

(54) PRETENSIONER AND PROCESS FOR MANUFACTURING THE SAME

(75) Inventors: Yoshihiro Yokote, Kanagawa (JP); Kazuhiko Tanaka, Hiroshima (JP); Hiroyuki Kimura, Hiroshima (JP)

(73) Assignees: Autoliv Development AS, Vargarda (SE); Matsumoto Heavy Industry Co., Ltd., Hiroshima (JP)

( * ) Notice: Subject to any disclaimer, the term of this patent is extended or adjusted under 35 U.S.C. 154(b) by 201 days.

(21) Appl. No.: 12/666,141

(22) PCT Filed: Jul. 6, 2007

(86) PCT No.: PCT/JP2007/063576
§ 371 (c)(1),
(2), (4) Date: Mar. 9, 2010

(87) PCT Pub. No.: WO2009/008039
PCT Pub. Date: Jan. 15, 2009

(65) Prior Publication Data
US 2010/0201179 A1     Aug. 12, 2010

(51) Int. Cl.
*B60R 22/36* (2006.01)
*A62B 35/00* (2006.01)
*B21D 39/06* (2006.01)
(52) U.S. Cl. .......................................... 280/806; 29/505
(58) Field of Classification Search .............. 280/806, 280/807, 741; 297/480, 474; 29/505, 506, 29/516, 447, 426.5, 421.1, 421.2; 60/632
See application file for complete search history.

(56) References Cited

U.S. PATENT DOCUMENTS

| | | | | |
|---|---|---|---|---|
| 2,162,510 A | * | 6/1939 | Matthaei et al. | 29/447 |
| 2,232,973 A | * | 2/1941 | Rood | 29/890.14 |
| 2,548,702 A | * | 4/1951 | Chamberlain | 72/325 |
| 2,748,463 A | * | 6/1956 | Mueller | 29/523 |

(Continued)

FOREIGN PATENT DOCUMENTS

| JP | 2000-326824 | 11/2000 |
|---|---|---|
| JP | 2000-326825 | 11/2000 |

(Continued)

OTHER PUBLICATIONS

International Search Report issued Aug. 7, 2007 in International (PCT) Application No. PCT/JP2007/063576.

*Primary Examiner* — Ruth Ilan
*Assistant Examiner* — Karen Beck
(74) *Attorney, Agent, or Firm* — Wenderoth, Lind & Ponack, LLP (57) ABSTRACT

A pretensioner (1) for a seat belt system (7) of an automobile includes a gas generator (2), a gas pipe (3), a piston (5) and a coupling mechanism (6). The gas generator is adapted to generate a high-pressure gas when a shock occurs in the automobile due to a collision, a sudden stop, etc. The gas pipe is formed to receive therein the gas generator. The gas pipe is adapted to guide the high-pressure gas released from the gas generator to the piston. The piston is adapted to be moved or displaced by the pressure of the high-pressure gas guided by the gas pipe. The coupling mechanism is connected to each of the piston and a buckle (8) of the seat belt system (7). The coupling mechanism is adapted to wind up or pull a seat belt (9) in accordance with the movement of the piston to increase a restraining force of the seat belt.

3 Claims, 5 Drawing Sheets

U.S. PATENT DOCUMENTS

| | | | | |
|---|---|---|---|---|
| 2,891,525 A * | 6/1959 | Moore | | 123/90.51 |
| 2,945,293 A * | 7/1960 | Last | | 228/115 |
| 3,372,452 A * | 3/1968 | Firth et al. | | 29/888.061 |
| 4,691,550 A * | 9/1987 | Dietzel | | 72/68 |
| 6,250,682 B1 * | 6/2001 | Betz et al. | | 280/806 |
| 6,363,722 B1 * | 4/2002 | Takehara et al. | | 60/632 |
| 6,450,573 B1 | 9/2002 | Yamaguchi et al. | | |
| 6,722,600 B2 * | 4/2004 | Hamaue et al. | | 242/374 |
| 6,758,077 B2 * | 7/2004 | Kaneko | | 72/85 |
| 6,908,104 B2 * | 6/2005 | Canterberry et al. | | 280/736 |
| 7,073,820 B2 * | 7/2006 | McCormick | | 280/741 |
| 7,089,739 B2 * | 8/2006 | Kameda et al. | | 60/632 |
| 7,533,902 B2 * | 5/2009 | Arnold et al. | | 280/806 |
| 7,762,585 B2 * | 7/2010 | Patterson et al. | | 280/740 |
| 7,854,201 B2 * | 12/2010 | Oda | | 102/202.14 |
| 7,878,548 B2 * | 2/2011 | Kohama | | 280/806 |
| 2003/0155757 A1 * | 8/2003 | Larsen et al. | | 280/741 |
| 2005/0134031 A1 * | 6/2005 | McCormick | | 280/741 |
| 2005/0151364 A1 * | 7/2005 | Kameda et al. | | 280/806 |
| 2007/0226984 A1 * | 10/2007 | Watanabe et al. | | 29/505 |
| 2009/0184508 A1 * | 7/2009 | Kohama | | 280/806 |
| 2010/0109295 A1 * | 5/2010 | McCormick et al. | | 280/728.1 |
| 2010/0176580 A1 * | 7/2010 | Tauchen | | 280/741 |
| 2010/0201179 A1 * | 8/2010 | Yokote et al. | | 297/480 |
| 2011/0198820 A1 * | 8/2011 | Janzen et al. | | 280/124.106 |
| 2012/0001414 A1 * | 1/2012 | Arning et al. | | 285/3 |
| 2012/0160051 A1 * | 6/2012 | Walser | | 74/492 |

FOREIGN PATENT DOCUMENTS

| | | |
|---|---|---|
| JP | 2005-199730 | 7/2005 |
| WO | WO 2007052700 A1 * | 5/2007 |

* cited by examiner

PRETENSIONER AND PROCESS FOR MANUFACTURING THE SAME

BACKGROUND OF THE INVENTION

1. Technical Field

The present invention relates to a gas pressure-driven type pretensioner for an automobile seat belt, in which a gas generator and a gas pipe are joined or fastened together by crimping an end-adjacent portion of the gas pipe onto the gas generator, and a production method therefor.

2. Description of the Related Art

Generally, an automobile is equipped with a seat belt system for restraining and protecting an occupant by a seat belt, in the event of a collision or a sudden stop of the automobile. In the seat belt system, the seat belt is received in a winder or retractor during non-use, and then withdrawn from the retractor before use. In a normal state, the seat belt can be freely withdrawn from the retractor during use of the seat belt system. Further, if slack occurs in the seat belt, the seat belt is automatically wound up by the retractor until the slack is removed. Thus, even though the seat belt, which is withdrawn from the retractor and in contact with an occupant, is kept in a tightened state without slack, it never hinders an occupant's movement for driving.

In the event of a collision or a sudden stop of the automobile, in response to a sudden force applied to the seat belt in a direction causing withdrawal of the seat belt from the retractor, the seat belt is locked within the retractor, so that it is kept from being further withdrawn from the retractor. This makes it possible to restrain an occupant to a seat so as to prevent forward movement of the occupant.

However, in the event of a collision or a sudden stop of the automobile, the operation of locking the seat belt involves a slight response lag or time delay. Consequently, the seat belt will be withdrawn from the retractor excessively to some extent. Moreover, depending on a posture or a seated position of an occupant, there is a possibility that the seat belt is in a position where it is slightly excessively withdrawn from the retractor, in the normal state.

In the event of a collision or a sudden stop of the automobile, if the seat belt is in such a position where it is slightly excessively withdrawn from the retractor, the seat belt system cannot adequately fulfill an occupant restraining or protecting function. Therefore, a seat belt system has been employed which is additionally provided with a pretensioner designed to wind up a seat belt or pull a seat belt in a direction for increasing a restraining force thereof, almost instantaneously in the event of a collision or a sudden stop of an automobile, to enhance the occupant restraining or protecting function. As one type of pretensioner, there has been known a gas pressure-driven type pretensioner using a gas generator adapted to generate a high-pressure gas based on combustion of a gas-generating agent, as a power source for winding up or pulling a seat belt (see, for example, JP 2000-326824A).

As one example of the gas pressure-driven type, a pretensioner can be employed which comprises a gas generator adapted to generate a gas when a shock is applied to an automobile due to a collision or a sudden stop thereof, and a gas pipe adapted to guide the generated gas to a piston, wherein a seat belt is wound up or pulled by means of movement of the piston. Generally, in the conventional gas pressure-driven type pretensioner, the gas generator is placed within the gas pipe made of a metal, at a position on the side of one end of the gas pipe. Then, the gas generator and the gas pipe are joined or fastened together by crimping the end portion of the gas pipe onto the gas generator.

Figure 7:
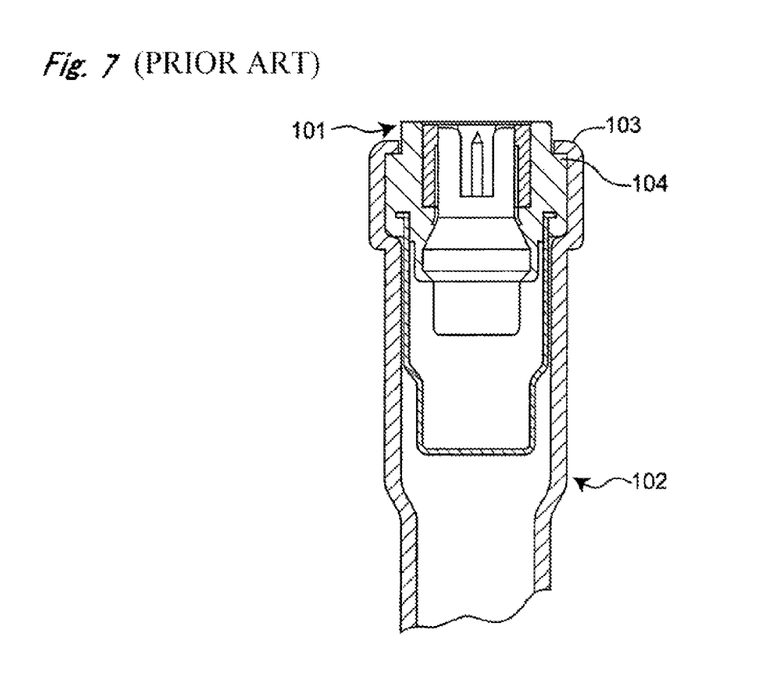
FIG. 7 is a partially sectional elevation view of a joined portion between a gas generator and a gas pipe, and a vicinity thereof, in a conventional pretensioner.

FIG. 7 shows one example of a joined portion between a gas generator and a gas pipe of a conventional gas pressure-driven type pretensioner. For example, in this conventional pretensioner, the gas generator 101 and the gas pipe 102 are joined or fastened together in the following manner. Firstly, the gas generator 101 is placed in a hollow portion inside the gas pipe 102 made of a metal, at a position on the side of one end of the gas pipe 102. Then, an end-adjacent portion 103 of the gas pipe 102 is crimped onto a crimping shoulder 104 of the gas generator 101, so that the gas generator 101 and the gas pipe 102 are joined or fastened together.

SUMMARY OF THE INVENTION

1. Problem to be Solved

In recent years, in connection with a need for improving occupant protective/restraint performance in the event of a collision or a sudden stop of an automobile, it has been strongly desired to shorten the time required for winding up or pulling a seat belt by the pretensioner (hereinafter referred to as "seat belt winding-up time-period"). For example, as measures for shortening a seat belt winding-up time-period, it is contemplated to increase an amount of a gas-generating agent to be charged into the gas generator, to increase the pressure of a gas to be generated. However, if the pressure of the gas to be generated by the gas generator is increased, the increased gas pressure will give rise to problems, such as a risk that the end-adjacent portion 103 of the gas pipe 102 crimped onto the gas generator will break or be deformed due to failing to withstand the gas pressure.

Figure 8:
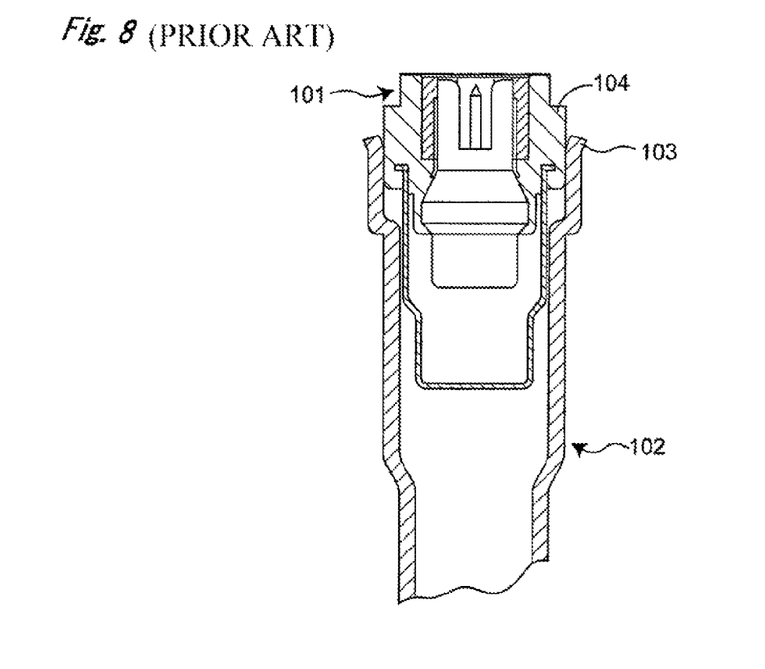
FIG. 8 is a partially sectional elevation view of the joined portion between the gas generator and the gas pipe, and the vicinity thereof, in the conventional pretensioner, in a state after a crimped portion of the gas pipe onto the gas generator is broken due to a higher-pressure gas generated by the gas generator.

For example, as shown in FIG. 8, due to the high gas pressure, a large force is applied to the gas generator 101 in a direction causing it to be moved away from the gas pipe 102 along an axial direction of the gas pipe 102, so that the crimped end-adjacent portion 103 is opened, and unfastened or disengaged from the crimping shoulder 104. In this case, a gap occurs between the gas generator 101 and the gas pipe 102 causing leakage of the gas therethrough. This makes it impossible to obtain the required gas pressure and sufficiently shorten the seat belt winding-up time-period.

In view of the above conventional problems, it is an object of the present invention or a problem to be solved by the present invention, to provide a gas pressure-driven type pretensioner capable of increasing a gas pressure from a gas generator without causing breaking or deforming of a gas pipe, while preventing or suppressing an increase in production cost, and a production method therefor.

2. Means for Solving the Problem

In order to achieve the above object, the present invention provides a pretensioner for a seat belt system of an automobile, which comprises a gas generator, a gas pipe, a movable member and a coupling mechanism. The gas generator is adapted to release a high-pressure gas when a shock occurs in the automobile. The gas pipe is formed to receive therein the gas generator. The gas pipe is adapted to guide the high-pressure gas released from the gas generator to the movable member. The movable member is adapted to be moved or displaced by a pressure of the high-pressure gas guided by the gas pipe. The coupling mechanism is connected to each of the movable member and a seat belt. The coupling mechanism is adapted to wind up or pull the seat belt in accordance with the movement of the movable member to increase a restraining force of the seat belt.

In the pretensioner, the gas generator and the gas pipe are joined together by crimping an end-adjacent portion of the gas pipe onto the gas generator. A wall thickness of a region of the gas pipe subjected to the crimping is set to be greater than that of a remaining region of the gas pipe. This means that the region is formed as a thick-walled region. Preferably, in the pretensioner of the present invention, a hardness of the region of the gas pipe having the greater wall thickness (thick-walled sub-region) is set to be greater than that of a remaining region of the gas pipe.

The present invention also provides a method of producing the above pretensioner including the gas generator, the gas pipe, the movable member and the coupling mechanism, which comprises a pipe expanding step, an upset forming step and a crimping step. In the pipe expanding step, a pipe member prepared as a blank of the gas pipe is subjected to a pipe expanding process, from the side of one end of the pipe member, to form a large-diameter section in the pipe member in a vicinity of the end. In the upset forming step, the pipe member is subjected to an upset forming process in such a manner that a pressing force is applied to a region of the large-diameter section on the side of the end, in an axial direction of the pipe member, to form a thick-walled region in the vicinity of the end of the pipe member so as to obtain the gas pipe. In the crimping step, a portion of the thick-walled region is crimped onto the gas generator to join or fasten the gas generator and the gas pipe together.

3. Advantages of the Invention

In the pretensioner of the present invention, the crimped end-adjacent portion of the gas pipe has a relatively large wall thickness, so that, even if a gas generated by the gas generator has a high pressure, the crimped end-adjacent portion of the gas pipe can withstand the gas pressure. In other words, a retaining force of the gas pipe relative to the gas generator is increased. This makes it possible to increase a pressure of a gas to be generated by the gas generator, i.e., increase an operating pressure for the movable member (e.g., to a value 1.5 times greater than ever before) so as to shorten the seat belt winding-up time-period of the pretensioner, for example, by increasing an amount of a gas-generating agent to be charged into the gas generator.

In addition, the remaining region (body region) of the gas pipe other than the end-adjacent portion (thick-walled region) has the same thickness as that of a conventional gas pipe, and an area ratio of the end-adjacent portion (thick-walled region) to the entire gas pipe is extremely small, so that an increase in weight of the gas pipe due to an increase in thickness of the end-adjacent section (thick-walled region) is negligible. Thus, in the pretensioner of the present invention, a gas pressure from the gas generator can be increased while preventing or suppressing increases in weight and production cost.

In the pretensioner of the present invention, a hardness of the thick-walled region of the gas pipe may be set to be greater than that of the remaining region of the gas pipe. In this case, the retaining force of the gas pipe relative to the gas generator can be further increased. This makes it possible to further increase the pressure of the gas to be generated by the gas generator so as to further shorten the seat belt winding-up time-period of the pretensioner.

In the pretensioner production method of the present invention, the thick-walled region is formed in the pipe member by the upset forming process. Thus, the thick-walled region can be easily formed without causing material loss as in a method based on a cutting process. A region to be plastically deformed when a pressing force is applied to the pipe member, i.e., the thick-walled region, can have a higher hardness. Thus, the end-adjacent portion of the gas pipe, i.e., a portion to be crimped onto the gas generator, can have a higher strength.

EXPLANATION OF REFERENCE NUMERALS

1: Pretensioner, 2: Gas generator, 3: Gas pipe, 4: Cylinder, 5: Piston, 6: Coupling mechanism, 7: Seat belt system, 8: Buckle, 9: Seat belt, 10: Tongue plate, 11: Link member, 12: Connection wire, 13: Pulley, 15: Large-diameter section, 16: Large shaft portion, 17: Cramping shoulder, 18: Cramped portion, 19: Thick-walled region, 20: Intermediate-diameter section, 21: Small-diameter section, 25: Pipe member, 26: Chucking die, 27: Punching die

DETAILED DESCRIPTION OF THE INVENTION

With reference to the accompanying drawings, the invention (embodiment of the present invention) will now be described. In the accompanying drawings, a common element or component is defined by the same reference numeral or code. Firstly, a structure of a pretensioner for a seat belt system of an automobile, according to one embodiment of the present invention, will be described.

As illustrated in FIGS. 1(a) and 1(b) by way of example, a pretensioner 1 according to one embodiment of the present invention comprises a gas generator 2. The gas generator 2 is received within a vicinity of one of opposite ends of a gas pipe 3. A right cylindrical-shaped cylinder 4 is connected to the other end of the gas pipe 3. A piston 5 is fitted in the cylinder 4 in such a manner that it can be linearly moved in an axial direction of the cylinder, i.e., in an X1-X2 direction (in place of the piston 5, a plurality of balls may be used). The piston 5 is coupled to a buckle 8 of a seat belt system 7 through a coupling mechanism 6. In the seat belt system 7, during use, a tongue plate 10 connected to a seat belt 9 is inserted into and fastened to the buckle 8, so that the seat belt 8 and the buckle 9 are connected together in such a manner as to pull each other in a Y1-Y2 direction.

The coupling mechanism 6 comprises a link member 11 connected to the piston 5 and adapted to be integrally moved together with the piston 5. The coupling mechanism 6 further comprises a connection wire 12 which has one end connected to the link member 11 and the other end connected to the buckle 8. The connection wire 12 is wound around a part of an outer circumferential portion of a freely rotatable pulley 13 (sprocket).

An operation of the pretensioner 1 according to this embodiment will be described below. When a strong shock occurs in an automobile (not shown) due to a collision with an obstacle or other automobile, a sudden stop of the automobile, etc., a controller (not shown) having a computer operates to apply an ignition voltage to the gas generator 2. For example, such a shock is detected by an acceleration sensor or the like. When the ignition voltage is applied to the gas generator 2, a gas-generating agent charged in the gas generator 2, such as explosive or propellant, is ignited by an initiator (not shown), so that a high-pressure gas (hereinafter referred to as "operating gas") having a pressure far greater than atmospheric pressure is almost instantaneously generated and released into the gas pipe 3. The operating gas is almost instantaneously introduced into the cylinder 4.

The operating gas introduced in the cylinder 4 operates to move the piston 5 in an X1 direction at an extremely high speed. In accordance with the movement, the link member 11 is integrally moved together with the piston 5 in the X1 direction, so that the link member-side end of the connection wire 12 is pulled in the X1 direction. Simultaneously, the seat belt-side end of the connection wire 12 is pulled in a Y1 direction. Thus, the seat belt 9 connected to the connection wire 12 through the buckle 8 and the tongue plate 10 is pulled in the Y1 direction. In the above manner, any slack of the seat belt due to a response lag in seat belt locking, an occupant's posture, etc., is removed to allow an occupant to be tightly restrained to a seat by the seat belt so as to be kept from forward movement. This makes it possible to ensure the safety of the occupant fastened by the seat belt.

A structure of a joined or fastened portion between the gas generator 2 and the gas pipe 3 will be described below.

Figure 2:
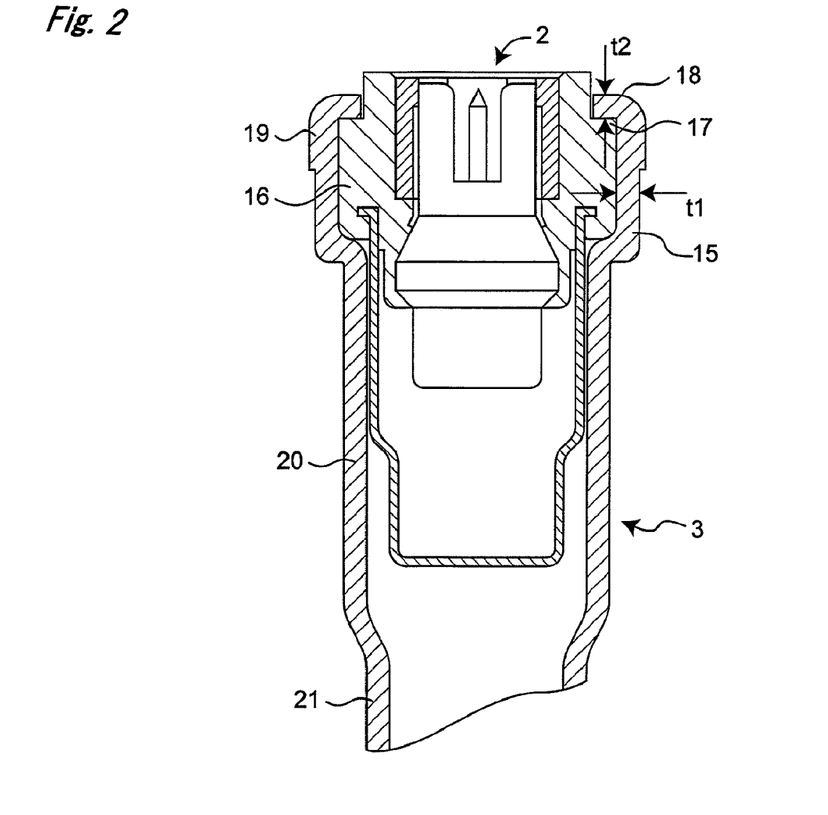
FIG. 2 is a partially sectional elevation view of a joined portion between the gas generator and a gas pipe, and a vicinity thereof, in the pretensioner illustrated in FIGS. 1(a) and 1(b).
Figure 3:
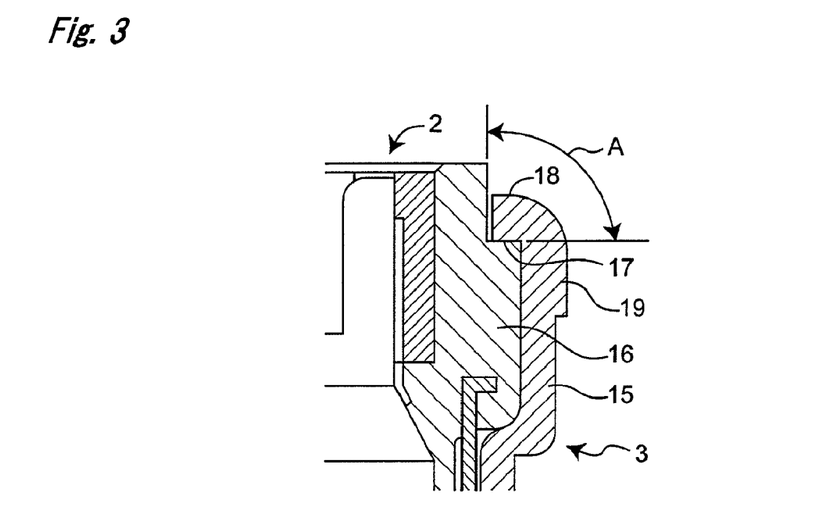
FIG. 3 is a partially sectional elevation view showing an enlarged view of the joined portion between the gas generator and the gas pipe in the pretensioner illustrated in FIG. 2.

As shown in FIGS. 2 and 3, the gas pipe 3 has a large-diameter section 15 formed in a vicinity of the gas generator-side end (hereinafter referred to as "first end") thereof to have a diameter greater than that of a remaining section of the gas pipe 3. A large shaft portion 16 of the gas generator 2 is fitted into the large-diameter section 15. A crimping portion 18 of the large-diameter section 15 adjacent to the first end is crimped (bent in a plastically deformed manner) onto a crimping shoulder 17 of the gas generator 2, and thereby the gas generator 2 and the gas pipe 3 are strongly joined or fastened together.

In this embodiment, a region of the large-diameter section of the gas pipe 3 on the side of the first end formed as a thick-walled region 19 having a wall thickness (t2) greater than that (t1) of a remaining region of the large-diameter section. The thick-walled region 19 is formed to include the crimping portion 18, i.e., formed over a range greater than the range indicated by the double-arrowed line A in FIG. 3. Further, a hardness of the thick-walled region 19 including the crimping portion 18 is set to be greater than that of a remaining region of the gas pipe 3.

Figure 4:
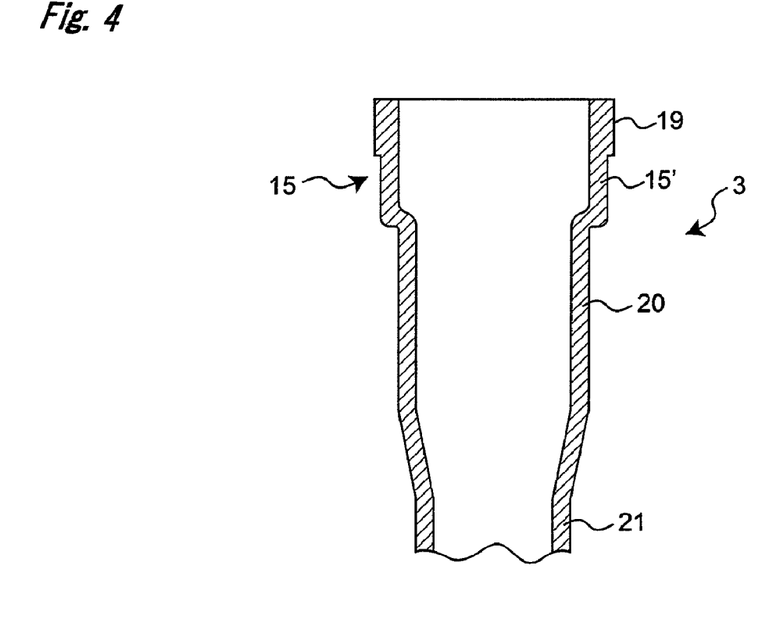
FIG. 4 is a partially sectional elevation view of a gas pipe in the pretensioner illustrated in FIGS. 1(a) and 1(b), in a state before a crimping process.

FIG. 4 shows the gas pipe 3 in a state before a process of crimping it onto the gas generator 2. As shown in FIG. 4, the gas pipe 3 before the crimping process is formed to have the thick-walled region 19, a remaining region 15' of the large-diameter section 15 other than the thick-walled region 19 (large-diameter region 15'), an intermediate-diameter section 20 having a diameter less than that of the large-diameter section 15, and a small-diameter section 21 having a diameter less than that of the intermediate-diameter section 20, in this order in a direction from the first end to the other end (hereinafter referred to as "second end"). For example, respective hardnesses (Vickers hardness (HV) values) of the above regions and sections are as follows. It is understood that the following hardnesses will be shown simply by way of example, and the present invention is not limited to the following values.

| | |
|---|---|
| Thick-walled region: | HV 230 |
| Large-diameter region: | HV 200 |
| Intermediate-diameter section: | HV 180 |
| Small-diameter section: | HV 180 |

Figure 5:
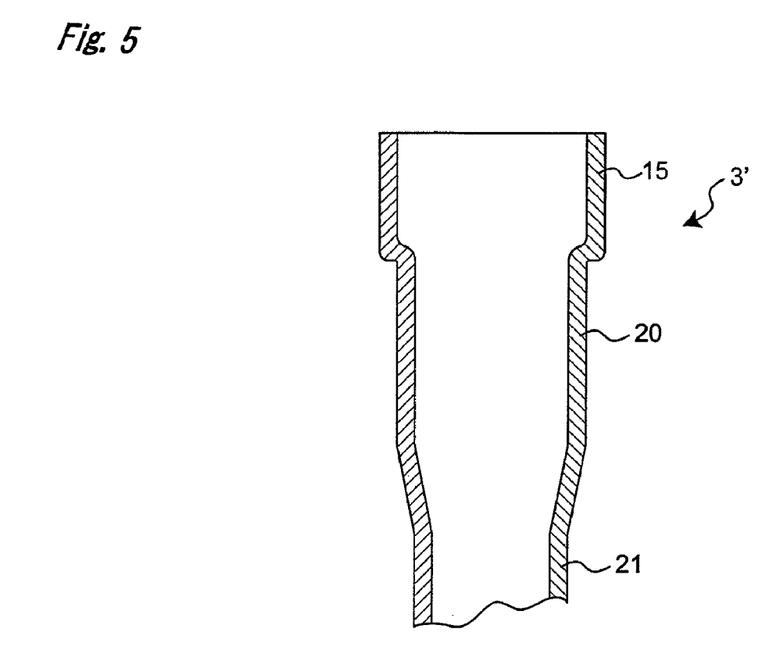
FIG. 5 is a partially sectional elevation view of a gas pipe in a conventional pretensioner in a state before a crimping process.

FIG. 5 shows a conventional gas pipe 3' in a state before it is crimped onto a gas generator. For example, in the conventional gas pipe 3', respective hardnesses of a large-diameter section 15, an intermediate-diameter section 20 and a small-diameter section 21 are as follows:

| | |
|---|---|
| Large-diameter section: | HV 200 |
| Intermediate-diameter section: | HV 180 |
| Small-diameter section: | HV 180 |

As above, in the pretensioner 1 according to this embodiment, the thick-walled region 19 including the crimping portion 18 has a relatively large wall thickness and a relatively high hardness, so that, even if the operating gas to be generated by the gas generator 2 has a high pressure, the crimping portion 18 can withstand the gas pressure. In other words, a retaining force of the gas pipe 3 relative to the gas generator 2 is increased. This makes it possible to increase a pressure of the operating gas to be generated by the gas generator 2 so as to shorten a seat belt winding-up time-period of the pretensioner 1.

The remaining region and sections of the gas pipe 3 other than the thick-walled region 19, i.e., each of the large-diameter region 15', the intermediate-diameter section 20 and the small-diameter section 21, have the same wall thickness as that of the conventional gas pipe 3', and an area ratio of the thick-walled region 19 to the entire gas pipe 3 is extremely small, so that an increase in weight of the gas pipe 3 due to the addition of the thick-walled region 19 is negligibly small. Thus, in the pretensioner 1 according to this embodiment, a gas pressure from the gas generator 2 can be increased while preventing or suppressing increases in weight and production cost.

A production method for producing the pretensioner 1 according to this embodiment, particularly a method of joining or fastening the gas pipe 3 and the generator 2 together, will be specifically described below.

(1) Pipe Cutting Step

Figure 6:
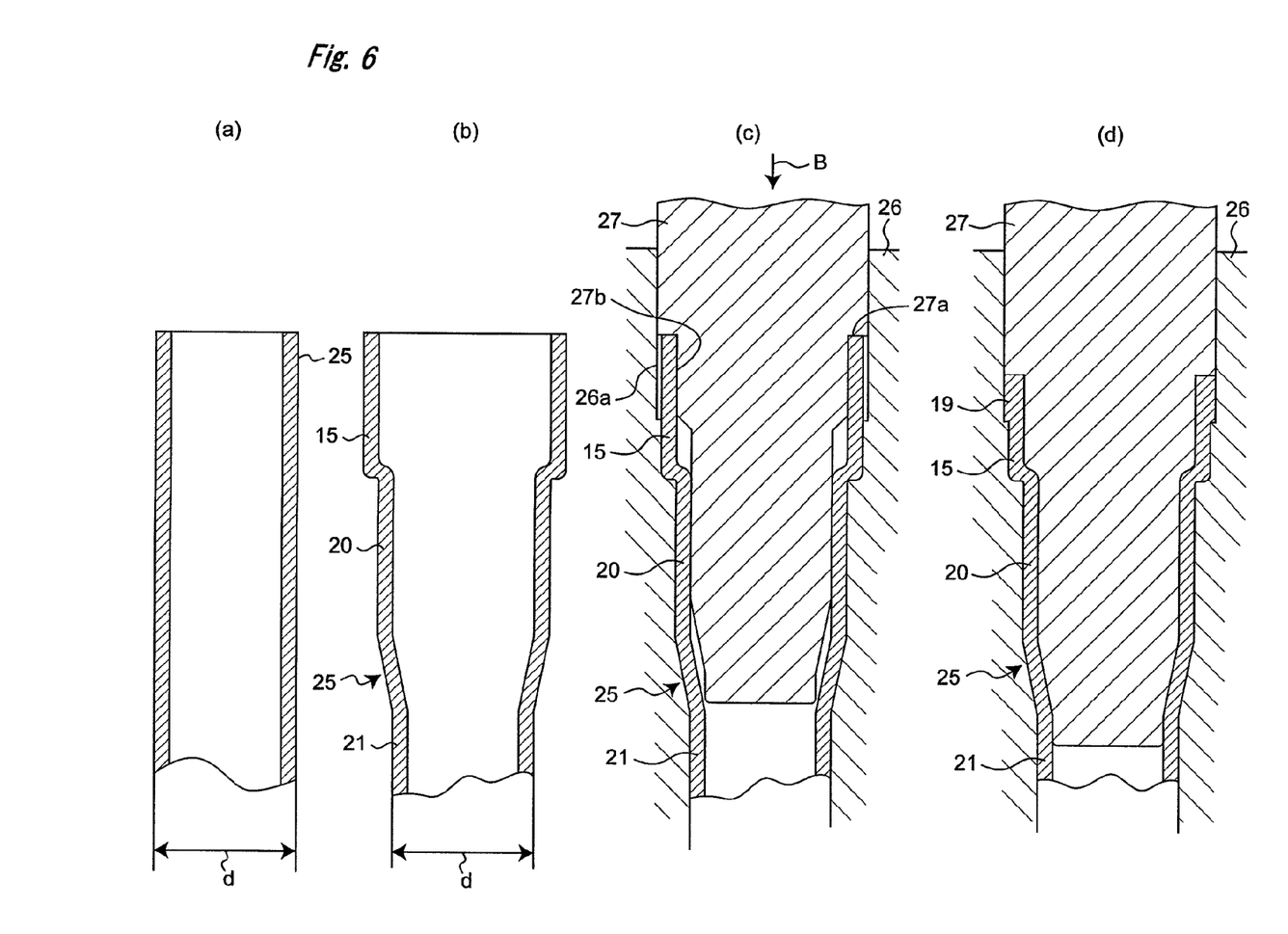
FIGS. 6(a) to 6(d) are diagrams showing a production procedure for the gas pipe illustrated in FIG. 4.

As shown in FIG. 6(a), in the production method for the pretensioner 1 according to this embodiment, firstly, an elongate linear-shaped pipe (outer diameter: d) made of a metal and formed to have a hardness, for example, of HV 180, is cut into a given length, and burrs produced on a cut surface are removed to prepare a pipe member 25 as a blank of the gas pipe 3.

(2) Pipe Expanding Step

Subsequently, as shown in FIG. 6(b), the pipe member 25 is subjected to a pipe expanding process using a pipe expanding tool (not shown) having an outer peripheral surface with a configuration corresponding to that of an inner peripheral surface of the gas pipe 3, from the side of one of opposite end of the pipe member 25 (the one end and the other end will hereinafter be referred to respectively as "first end" and "second end"), to form a large-diameter section 15 in a vicinity of the first end, and further form an intermediate-diameter section 20 on the side of the second end relative to the large-diameter section 15. An inner diameter of the large-diameter section 15 is set to be approximately equal to or slightly greater than an outer diameter of the large shaft portion 16 (see FIG. 2) of the gas generator 2. A region on the side of the second end relative to the intermediate-diameter section 20 is not subjected to the pipe expanding process, so that it is formed as a small-diameter section 21 (outer diameter: d). A transition region between the large-diameter section 15 and the small-diameter section 21 is formed in a tapered shape to have a diameter which gradually changes. In the pipe expanding step, a hardness of the large-diameter section is increased, for example, up to HV 200, by a pressing force applied from the pipe expanding tool.

(3) Upset Forming Step

Subsequently, as shown in FIG. 6(c), the pipe member 25 formed to have the large-diameter section 15, the intermediate-diameter section and the small-diameter section 21 is placed in a hollow portion of a chucking die 26 having an inner peripheral surface with a configuration corresponding to that of an outer peripheral surface of the gas pipe 3. Then, a punching die 27 having a pressing portion 27a and an outer peripheral surface with a configuration corresponding to that of the inner peripheral surface of the gas pipe 3 is inserted into the hollow portion of the chucking die 26 or a hollow portion of the pipe member 25. The pressing portion 27a is provided as a means to press the first end of the pipe member 25 in an axial direction of the pipe member 25, i.e., in the direction of arrow B. At this timing (before start of an upset forming process), the pressing portion 27a of the punching die 27 is in contact with the first end of the pipe member 25 (large-diameter section 15). Further, a distance between a portion 26a of the chucking die 26 having the largest inner diameter and a portion 27b of the punching die 27 having a second-largest outer diameter is set to conform to a wall thickness of the thick-walled region 19 of the gas pipe 3.

Then, the pipe member 25 is subjected to an upset forming process in such a manner that the punching die 27 is displaced or moved in the direction B to apply a pressing force to a region of the large-diameter section 15 of the pipe member 25 on the side of the first end, in the axial direction of the pipe member 25.

Thus, as shown in FIG. 6(d), the large-diameter section 15 of the pipe member 25 is plastically deformed to form the thick-walled region 19 so as to obtain the gas pipe 3 illustrated in FIG. 4. Through the upset forming process, a hardness of the thick-walled region 19 is increased, for example, up to HV 230, by a pressing force applied from the punching die 27. Then, a surface of the obtained gas pipe 3 is subjected to a surface treatment.

(4) Gas Generator Insertion Step

The gas generator 2 is inserted into a hollow portion of the gas pipe 3 formed to have the thick-walled region 19, from the side of the first end. During the insertion step, the large shaft portion 16 of the gas generator 2 is fitted into the hollow portion of the gas pipe 3 (or the large-diameter section 15). The large shaft portion 16 cannot get into the intermediate-diameter section 20, so that the gas generator 2 is kept in a predetermined position within the gas pipe 3.

(5) Crimping Step

Subsequently, a portion of the thick-walled region 19 of the gas pipe 3 is crimped (bent in a plastically deformed manner) onto the crimping shoulder 17 of the generator 2 to join or fasten the gas generator 2 and the gas pipe 3 together. The crimping process may comprise a pres forming process or a rotary forming process, or may comprise a combination of the pres forming process and the rotary forming process. Through the above steps, the structure illustrated in FIG. 2 is obtained.

In the method of producing the pretensioner 1 according to this embodiment, the thick-walled region 19 is formed in the pipe member 25 by the upset forming process. Thus, the thick-walled region 19 can be easily formed without causing material loss as in a method based on a cutting process. In addition, a hardness of the thick-walled region 19 is increased when a pressing force is applied to the large-diameter section 15 of the pipe member 25 during the upset forming process. Thus, the strength or rigidity of the crimping portion 18 of the gas pipe 3 can be increased without a particular hardening treatment, such as a heat treatment.

As above, although the present invention has been described in connection with a specific embodiment thereof, it will be apparent to those skilled in the art that various changes and modifications may be made therein. Therefore, the present invention is not limited to the specific embodiment, but the scope of the present invention should be determined by the appended claims and their legal equivalents.

Figure 1:
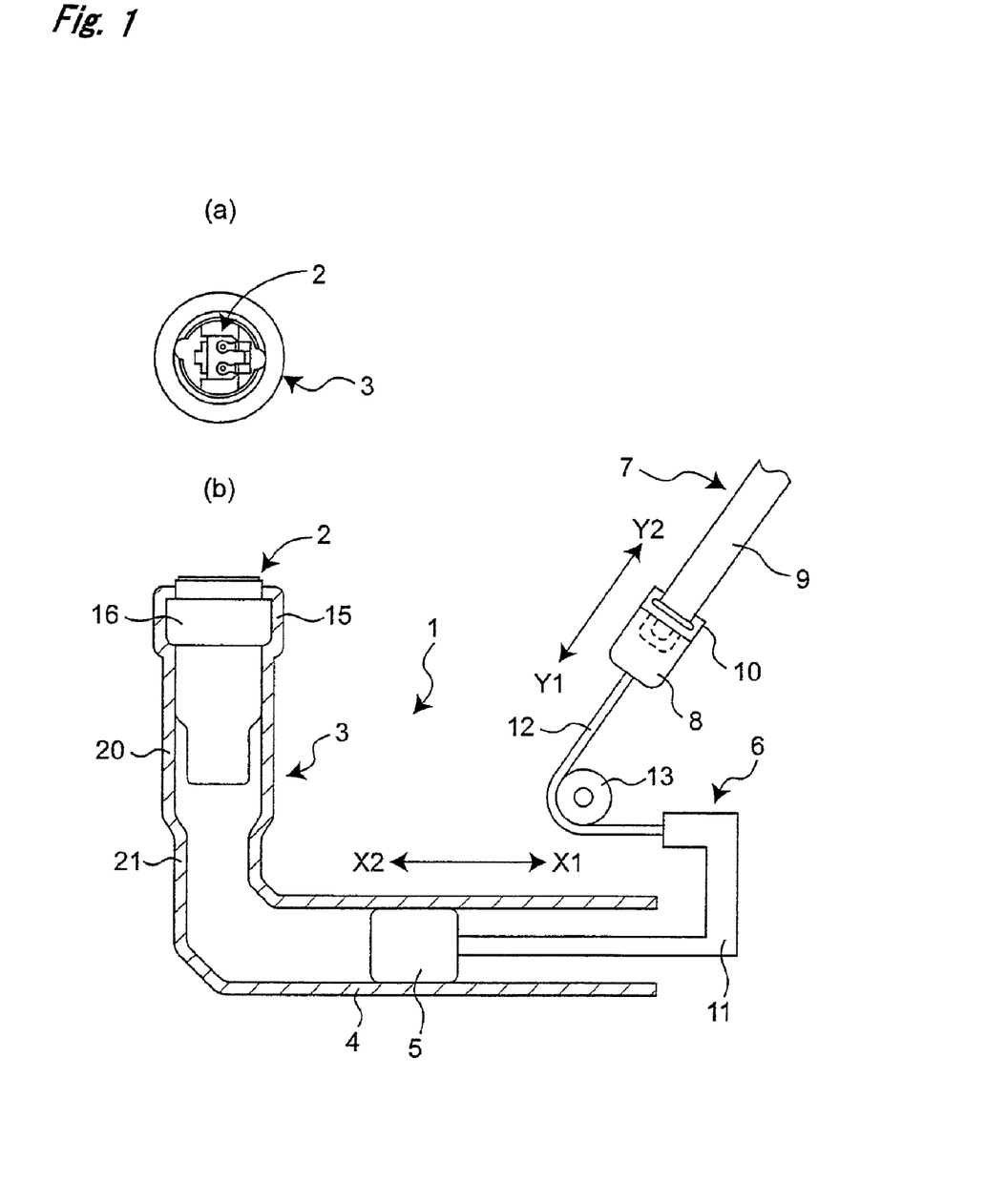
FIG. 1(a) is a top plan view of a gas generator and a vicinity thereof in a pretensioner for a seat belt system of an automobile, according to one embodiment of the present invention.
FIG. 1(b) is a partially sectional elevation view of the pretensioner.

Although not illustrated, the present invention can be applied to a gas pipe structure for a pretensioner designed to be installed to rotate a spindle shaft of a seat belt retractor in a direction for winding up a seat belt, as well as a pretensioner associated with a seat belt buckle as shown in FIG. 1.

As described above, the pretensioner of the present invention is useful as a means to almost instantaneously remove slack of a seat belt in the event of a collision or a sudden stop of an automobile, and suitable for use as a one occupant protection device for automobiles.

The invention claimed is:

1. A pretensioner for a seat belt system of an automobile, the pretensioner comprising:
   a gas generator adapted to release a high-pressure gas when a shock occurs in the automobile;
   a gas pipe formed to receive therein the gas generator and adapted to guide the gas;
   a movable member adapted to be moved by a pressure of the gas guided by the gas pipe; and
   a coupling mechanism connected to the movable member and adapted to be connected to a seat belt of the seat belt system to wind up or pull the seat belt in accordance with the movement of the movable member to increase a restraining force of the seat belt,
   wherein the gas pipe has a small-diameter section, an intermediate-diameter section and a large-diameter section having a diameter greater than that of the small-diameter section and intermediate-diameter section of the gas pipe,
   wherein a large shaft portion of the gas generator is fitted into the large-diameter section of the gas pipe, wherein the gas generator and the gas pipe are joined together by a crimping portion which is crimped onto a crimping shoulder formed on the large shaft portion of the gas generator, wherein the large-diameter section of the gas pipe existing around the large shaft portion of the gas generator has a thick-walled region in a vicinity of an end of the gas pipe and a thin-walled region which is thinner than the thick-walled region, and wherein the thick-walled region in the vicinity of the end of the gas pipe includes the crimping portion, and the thick-walled region extends from the crimping portion along the large-diameter section and terminates at an intermediate part of the large-diameter section.

2. The pretensioner according to claim 1, wherein a hardness of the thick-walled region of the gas pipe is set to be greater than that of the remaining region of the gas pipe.

3. A method of producing a pretensioner for a seat belt system of an automobile, the pretensioner including: a gas generator adapted to release a high-pressure gas when a shock occurs in the automobile; a gas pipe formed to receive therein the gas generator and adapted to guide the gas; a movable member adapted to be moved by a pressure of the gas guided by the gas pipe; and a coupling mechanism connected to each of the movable member and a seat belt of the seat belt system and adapted to wind up or pull the seat belt in accordance with the movement of the movable member to increase a restraining force of the seat belt, the method comprising the steps of:

subjecting a pipe member prepared as a blank of the gas pipe to a pipe expanding process, from the side of one end of the pipe member, to form a small-diameter section, an intermediate-diameter section and a large-diameter section having a diameter greater than that of the small diameter section and the intermediate-diameter section of the gas pipe, the large-diameter section being formed in the pipe member in a vicinity of the one end;

subjecting the pipe member to an upset forming process in such a manner that a pressing force is applied to a region of the large-diameter section on the side of the end, in an axial direction of the pipe member, to form a thick-walled region in the vicinity of the end of the pipe member and a thin-wailed region which is thinner than the thick-walled region so as to obtain the gas pipe, the thick-walled region extending from the end of the pipe member along the large-diameter section and terminating at an intermediate part of the large-diameter section;

fitting a large shaft portion of the gas generator into the large-diameter section of the gas pipe so as to make the large-diameter section of the gas pipe exist around the large shaft portion of the gas generator; and crimping a portion of the thick-walled region onto a crimping shoulder formed on the large shaft portion of the gas generator to join the gas generator and the gas pipe together by a crimping portion so as to make the thick-walled region in the vicinity of the end of the gas pipe include the crimping portion.

\* \* \* \* \*

UNITED STATES PATENT AND TRADEMARK OFFICE
CERTIFICATE OF CORRECTION

PATENT NO. : 8,366,151 B2
APPLICATION NO. : 12/666141
DATED : February 5, 2013
INVENTOR(S) : Yoshihiro Yokote It is certified that error appears in the above-identified patent and that said Letters Patent is hereby corrected as shown below:

On the Title Page:
Item (73) Assignees:
    Change "Autoliv Development AS, Vargarda (SE)" to -- Autoliv Development AB, Vargarda (SE) --.

Signed and Sealed this
Twenty-eighth Day of May, 2013

Teresa Stanek Rea
*Acting Director of the United States Patent and Trademark Office*